United States Patent
Sharma (10) Patent No.: US 10,732,864 B2
(45) Date of Patent: Aug. 4, 2020

(54) INTERNAL POWER ANALYZER FOR DATA STORAGE DEVICE

(71) Applicant: Western Digital Technologies, Inc., San Jose, CA (US)

(72) Inventor: Sahil Sharma, Ambala (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 326 days.

(21) Appl. No.: 15/666,877

(22) Filed: Aug. 2, 2017

(65) Prior Publication Data

US 2019/0042119 A1 Feb. 7, 2019

(51) Int. Cl.
*G06F 3/06* (2006.01)

(52) U.S. Cl.
CPC ............ *G06F 3/0625* (2013.01); *G06F 3/061* (2013.01); *G06F 3/065* (2013.01); *G06F 3/0634* (2013.01); *G06F 3/0653* (2013.01); *G06F 3/0655* (2013.01); *G06F 3/0679* (2013.01)

(58) Field of Classification Search
CPC ...... G06F 3/0625; G06F 3/065; G06F 3/0655; G06F 3/0679
See application file for complete search history.

(56) References Cited

U.S. PATENT DOCUMENTS

| 8,327,177 | B2 | 12/2012 | Farhan et al. |
| 8,694,719 | B2 | 4/2014 | Lassa et al. |
| 9,009,517 | B2 * | 4/2015 | Mayer ...................... G06F 1/32 713/340 |
| 9,037,820 | B2 | 5/2015 | Ratn et al. |
| 9,280,200 | B1 | 3/2016 | Glassburn et al. |
| 9,323,304 | B2 | 4/2016 | Salessi et al. |
| 9,367,353 | B1 * | 6/2016 | Ellis ..................... G06F 9/4893 |
| 9,405,355 | B2 | 8/2016 | Bahirat |
| 2011/0047316 | A1 | 2/2011 | Farhan et al. |
| 2015/0309752 | A1 | 10/2015 | Ellis et al. |

* cited by examiner

*Primary Examiner* — Terrell S Johnson
(74) *Attorney, Agent, or Firm* — Loza & Loza, LLP; Gabriel Fitch (57) ABSTRACT

A data storage device includes a power input port, a nonvolatile memory module, a controller for the nonvolatile memory module, and a power analyzer electrically coupled to the power input port. The power analyzer is configured to receive input power from the power input port, determine power data associated with the data storage device based on the input power, and store the power data in a memory of the power analyzer.

36 Claims, 4 Drawing Sheets

INTERNAL POWER ANALYZER FOR DATA STORAGE DEVICE

BACKGROUND

Field

This disclosure relates to computing devices and systems. More particularly, the disclosure relates to systems and methods for managing power in data storage devices.

Description of Related Art

In certain computing systems, such as data storage systems, power management can have an effect on device performance. Measurement of power consumption in a data storage device can be useful in implementing power management therein. However, derivation of power measurement data related to data storage devices can be difficult.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to power management in data storage devices and other computing devices and systems.

Overview

The present disclosure relates to systems, devices, and methods for implementing power throttling and/or optimization in data storage devices and other computing devices and systems. Certain embodiments disclosed herein provide for power monitoring and/or management within a data storage device that may be implemented during runtime. The term "power throttling" is used here and according to its broad and/ordinary meaning, and may be used in the context of power conservation mechanisms for reducing the power consumption of a data storage device or other computing device or system. For example, with respect to host-powered data storage devices and systems, power throttling may be desirable where the data storage device and/or component(s) thereof are configured to operate at a first power level (e.g., 6 W), whereas the host power supply may be configured or designed to operate at a higher power level (e.g., 8 W). In such instances, it may be desirable to throttle the power supply from the host down in some manner in order to achieve compatibility with the data storage device.

Power throttling may be based on certain power measurements associated with the relevant device or system. For example, in some implementations, power throttling mechanisms may rely on measurements of device power obtained through the use of external power measurements devices or systems. One example may involve the use of an oscilloscope, or other power, voltage, or current measurement tool, which may be used through an external connection to a data storage device to analyze the power usage and/or profile of the data storage device. However, among other shortcomings, power throttling processes that depend on external measurement tools may be difficult or impossible to implement during runtime of the data storage device.

In some systems, power throttling may be implemented through the use of pre-calculated power-based values or parameters, which may be based at least in part on readings from external power analyzer tools. Such external power analyzer tools (e.g., oscilloscope) may be used to measure power usage of a device for a particular workload (e.g., read and/or write). However, the use of pre-calculated power parameters may not allow for implementation of dynamic power throttling runtime. Furthermore, where the relevant device is located remotely, such as at/with an end-user, it may be difficult or impossible to determine the power supply/usage of the device at the end-user end. In addition, as different data storage devices may have different internal impedances, the power usage from one device to another (e.g., solid-state data storage drive (SSD)) may likewise vary. Therefore, pre-calculated/determined power values appropriate for, or corresponding to, one device may not work as well for another.

In some implementations, power throttling may be implemented with respect to a solid-state data storage device comprising a plurality of solid-state media dies/chips/devices, wherein power consumption of the data storage device is reduced by limiting the number of dies that are powered, enabled, or operated. That is, power throttling in accordance with the present disclosure may involve reducing a number of data storage devices or modules that are operated in a data storage device or system to a subset thereof in order to reduce the amount of power consumed collectively by the components of the data storage device. As an example, in some embodiments, a data storage device comprises a quantity 'N' (e.g., 16) of solid-state storage dies implemented on, for example, an internal circuit board of the data storage device. In such example, power throttling may be implemented by reducing the number of dies powered by the data storage device from N (e.g., 16) to a number 'M' (e.g., 12) that is less than N, representing a subset of the total number of dies. The number of dies or modules powered in a power throttling process may be determined based on the use of an external power measurement tool to calculate power consumption of the data storage device when a fixed voltage is applied thereto. However, where the number of dies or modules powered in accordance with the power throttling mechanism is determined according to pre-calculated power measurement, such determination may be inadequate for relying upon with respect to different data storage devices.

In some implementations, the present disclosure provides devices, systems, and methods for implementing power throttling/management with respect to a data storage device through the use of internal power analyzer circuitry/component(s) within the data storage device (e.g., inside an SSD), which may provide power values to the controller of the data storage device using any desirable protocol, such as a serial communication protocol (e.g., Inter-Integrated Circuit (I2C), Serial Peripheral Interface (SPI), Universal Asynchronous Receiver/Transmitter (UART), or the like). Internal power analyzers in accordance with the present disclosure may allow for implementation of dynamic runtime power throttling for a data storage device. In certain embodiments, an internal power analyzer comprises a relatively small amount of data storage, wherein current, voltage and/or power values may be saved in such data storage, and relied upon for power throttling/management determination and implementation. For example, the controller of the data storage device may be configured to read and/or request power values saved and the internal power analyzer and use the power values for power throttling. In some implementations, power throttling/management in accordance with the present disclosure may at least partially obviate the need for reliance on external power analyzer measurement tools/instruments for power, current, and/or voltage measurements. Furthermore, internal power analyzer embodiments in accordance with the present disclosure may allow for runtime power throttling, rather than requiring use of pre-calculated power measurement values taken from external measurement tools (e.g., oscilloscope), which may provide performance improvement for the data storage device and/or system. In addition, internal power analyzer circuitry and/or devices, as described herein, may allow for power analysis and/or management for data storage devices located remotely (e.g., in the field). Internal power analysis tools in accordance with the present disclosure may be designed to determine whether proper power supply is being used, or has been used, for a data storage device. In certain embodiments, the internal power analyzer may be configured to track the amount of power dissipated over the data storage device components.

Aspects of the present disclosure are described herein with reference to the drawings. In the present disclosure, common features may be designated by common reference numbers. Although certain examples are described herein with reference to a data storage device, it should be appreciated that techniques and principles described herein are applicable to other implementations. Furthermore, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify or describe an element, such as a structure, a component, an operation, etc., does not necessarily indicate priority or order of the element with respect to any other element, but rather may generally distinguish the element from another element having a similar or same name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited. As used herein, "exemplary" may indicate an example, an implementation, and/or an aspect, and should not be construed as limiting or as indicating a preference or a preferred example, implementation, and/or aspect.

Although certain embodiments are disclosed herein in the context of solid-state data storage devices and systems, it should be understood that certain features disclosed herein may be applicable to devices/systems incorporating one or more other types of data storage, such as magnetic media, or other volatile or nonvolatile memory. As used in this application, "nonvolatile solid-state memory," "nonvolatile memory," "NVM," or variations thereof may refer to solid-state memory such as NAND flash. However, the systems and methods of this disclosure may also be useful in more conventional hard drives and hybrid drives including both solid-state and hard drive components. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (nonvolatile solid-state memory) chips. The nonvolatile solid-state memory arrays or storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Power Management System

Figure 1:
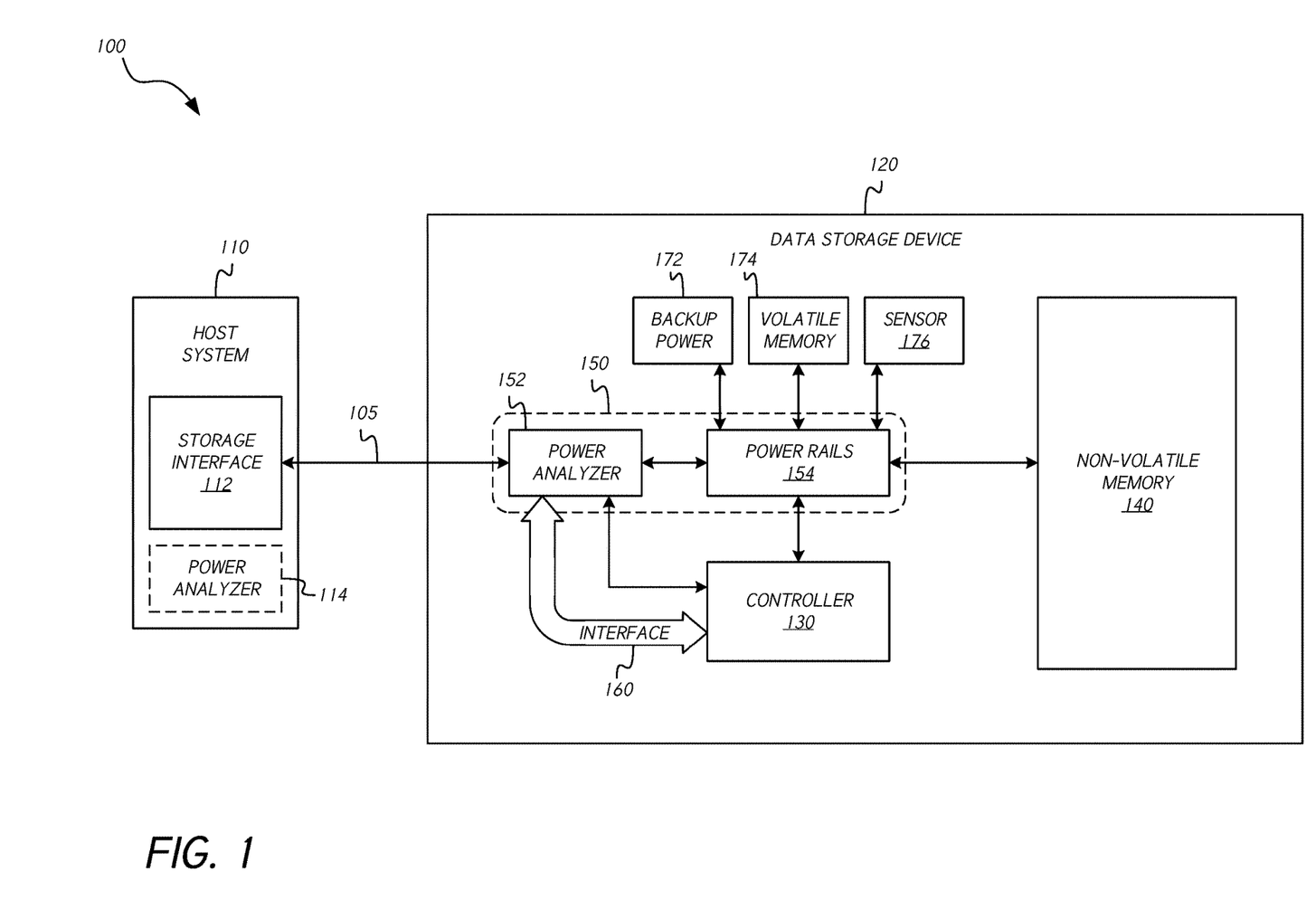
FIG. 1 illustrates a block diagram of a data storage system including an internal power analyzer in accordance with one or more embodiments.

FIG. 1 illustrates a block diagram of a data storage system 100 comprising a data storage device 120 coupled to a host system 110. The data storage device 120 comprises a controller 130, which may be configured to implement controller functionality for a nonvolatile memory module 140, such as a solid-state data storage device/module, magnetic media, or the like. The data storage device 120 may incorporate internal power analyzer functionality in accordance with one or more embodiments disclosed herein. The data storage device 120 may be any type storage device, module, component, system, or the like. Furthermore, the terms "drive" and "data storage drive" may be used herein in certain contexts refer to any type storage device, and may be used substantially interchangeably with the term "data storage device" in some contexts. For example, the terms "drive," "solid-state drive," and the like, may be used to refer to a data storage device, which may be embodied in a board having one or more solid-state memory chips mounted thereon or associated therewith, wherein the board may be disposed within a housing. With respect to the system 100 of FIG. 1, the terms "data storage drive" and/or "solid-state drive" may refer to the data storage device 120 and/or the nonvolatile memory module 140.

Although FIG. 1 illustrates a data storage system 100, it should be understood that the power management principles and embodiments disclosed herein may be applicable to any type of computing device or systems implementing power management. Furthermore, although certain power analysis/management functionality is described herein as implemented by the controller of a data storage device and/or power analyzer module/circuitry of the data storage device, it should be understood that such functionality may be implemented using any control circuitry of a data storage system, or host device or system communicatively or electrically coupled to a data storage device.

The host system 110 may be coupled to the data storage device over any suitable or desirable interface, and may be configured to provide power 105 to the data storage device 120 over such interface. In certain implementations, the host system 110 is associated with one or more external measuring instruments 114 for measuring power, current, and/or voltage. For example, the host system 110 may be associated with an oscilloscope or the like. The host system 110 provides the power input 105 to the data storage device 120. In some implementations, the data storage device is configured to implement power, current, and/or voltage measurements internally using an internal power analyzer 152 without requiring external measuring instrumentation.

In some implementations, power throttling for a data storage device may be performed in a generally-static manner. For example, the data storage device may be run using a fixed-voltage power source, where the power consumption of the data storage device is measured for a given performance and/or workload using an externally coupled power analyzer, such as the power analyzer 114 of the host system 110, as shown in FIG. 1. The amount of power consumption of the data storage device 120 may vary based on the amount of host-driven and/or internal (e.g., internal data management) storage access activity. In addition, the power usage of the data storage device 120 may be relatively abrupt in some situations, causing power spikes and/or supply voltage transients that may exceed the regulation capability of the power source and/or management system.

The data storage device comprises nonvolatile memory 140, which may comprise one or more of solid-state memory and magnetic disk memory. Although certain power analyzer devices and methods are described herein in the context of solid-state data storage devices, it should be understood that the disclosed embodiments may be applicable to, and/or implemented in, data storage systems comprising other types of data storage media, such as magnetic media. Furthermore, the data storage device 120, in certain embodiments, may be a hybrid data storage device comprising both solid-state data storage media as well as magnetic disk media.

Although certain embodiments are disclosed herein in the context of a single nonvolatile memory module 140, it should be understood that the data storage device 120 may comprise a plurality of nonvolatile memory modules (e.g., solid-state memory chips/dies) that are controlled at least in part by the controller 130. Such modules may be referred to herein as memory units, modules, devices, dies, chips, or the like. In certain embodiments, one or more of the controller 130, power analyzer 150, and the nonvolatile memory module 140 may be mounted to a printed circuit board (not shown). In certain embodiments, the controller 130, power analyzer 150, and nonvolatile memory 140 are mounted to one or more separate boards.

The controller 130 (e.g., control circuitry) of the data storage device 120 (e.g., hybrid hard drive, solid-state drive, etc.) is configured to receive data commands from the host system 110, and to execute such commands in the nonvolatile memory module 140. The commands received and/or executed by the controller 130 may include, for example, read/write commands, and the like. The controller 130 may comprise one or more processors, memory devices, data and/or power transmission channels/paths, boards, chips, dies, or the like. The controller 130 may be configured to receive data commands from a storage interface (e.g., a device driver) 112 residing at the host system 110. The controller 130 may communicate with the host system 110 over a host interface and receive the data storage access commands using the host interface. The host interface may comprise any suitable or desirable communication protocol, including, but not limited to, Universal Serial Bus (USB), Small Computer System Interface (SCSI), Peripheral Component Interconnect Express (PCIe), Universal Flash Storage (UFS), or the like. In certain embodiments, the host interface provides the power source 105 to the data storage device 120.

The data storage device 120 is configured to store data received from the host system 110, such that the data storage device 120 acts as data storage for the host system 110. To facilitate this function, the controller 130 can implement a logical interface. The logical interface can present to the host system 110 memory as a set of logical addresses (e.g., sequential/contiguous addresses) where data can be stored. For example, host data storage access commands may specify a logical block address in the data storage device 120. Internally, the controller 130 may be configured to map the logical addresses to respective physical memory addresses in the nonvolatile (e.g., solid-state) memory module 140 and/or other memory module(s). In certain embodiments, mapping data may be loaded from the nonvolatile memory module 140. The mapping data may be flushed to the nonvolatile memory module 140 prior to power down of the data storage device 120 in order to allow for the restoration of the mapping data following a power cycle. The controller 130 may also be configured to send data and commands to the memory module 140 associated with background scanning operations, write leveling, garbage collection operations, and/or wear leveling operations, etc., as illustrative, non-limiting examples.

In certain embodiments in which the nonvolatile memory 140 comprises solid-state media, the nonvolatile memory 140 may comprise one or more blocks of storage, with each block comprising a plurality of pages. For example, a page may represent a smallest grouping of memory cells in the nonvolatile memory 140 that can be programmed in a single operation or as a unit.

In certain embodiments, the nonvolatile storage 140 comprises solid-state memory cells, which may be arranged in a row-and-column fashion with circuitry configured to access individual cells of the storage media. The memory cells may comprise transistors, such as floating gate transistors, configured to store an analog voltage value that can be interpreted to hold, for example, to logical states in the case of single-level cell (SLC) programming, or more than two logical states in the case of multi-level cell (MLC) programming. The nonvolatile memory 140 may have any suitable or desirable cell design, such as, for example re-RAM, PCM, CT, FG, resistive cell, or other cell design or architecture.

The data storage device 120 comprises internal power analyzer/regulation circuitry 150, which may serve as a main power supply unit/regulator for providing power supplies to various components of the data storage device 120, such as to the device controller 130, backup power 172, volatile memory 174, sensor 176, and/or other component(s). In certain embodiments, the controller 130 is a solid-state memory controller (e.g. NAND), which may include one or more processors (not shown) configured to execute firmware for the device 120. The device controller 130 may interface with, and control, the nonvolatile memory 140, which may include NAND flash memory, for example. The power analyzer/regulator circuitry 150 may comprise a self-contained module configured to provide regulated power for the various components of the data storage device 120 based on a main host power input 105 from the host system 110. In certain embodiments, the power analyzer/regulator circuitry 150 is configured to provide a core voltage and input output (I/O) voltage to the controller 130 and the nonvolatile memory 140.

The data storage device is configured to implement internal power analyzer functionality using the power analyzer/ regulator circuitry 150. The power analyzer/regulator circuitry 150 may comprise power analyzer component 152 as well as power rail circuitry 154. When the power input 105 is received from the host system 110, the power analyzer 152 may be configured to calculate or otherwise determine the voltage, current, and/or power in the data storage device 120 and store power data based thereon in the data storage device 120, such as within the power analyzer 152. For example, the power analyzer 152 may comprise some amount of data storage for saving current, voltage, and/or power-related data or values. The power rail circuitry 154 may be configured to distribute the fixed voltage supply to other modules or components of data storage device 120. In certain embodiments one or both of the power analyzer 152 and power rails 154 may be embodied in an integrated circuit chip or device.

The term "power analyzer" may be used herein to describe the power analyzer component 152, or the combination of the power analyzer component 152 with the power rails component 154, as designated by reference number 150. The power analyzer 152 may be utilized to implement power throttling at runtime of the data storage device 120. In certain embodiments, the power analyzer 152 comprises a relatively small amount of memory/data storage in which the current, voltage, and/or power values derived by the power analyzer 152 may be saved. The controller 130 may be able to read/access such power-related values in the power analyzer 152 for use in execution of power throttling within the data storage device 120. The power rail circuitry 154 may allow the power analyzer 150 to support the capability of providing different fixed voltages to the various components of the data storage device 120. That is, the power rails 14 may provide DC voltage rails to the different modules of the data storage device 120. The power rails 154 may allow for distribution of power at different DC voltage levels, wherein each rail can provide a single fixed voltage provided by the power regulator circuitry 150 (e.g. 5 V, 3.3 V, etc.). For each different rail, the power rails component 154 may provide circuitry for generating the associated voltage. The voltage rails 154 may further comprise certain wires and/or connectors to distribute the DC voltage to the hardware that utilizes it.

In certain embodiments, the power analyzer 152 comprises data storage registers (not shown), which may be used for various purposes. For example, the registers may be used to store configuration parameters associated with an interface 160 over which the power analyzer may communicate with the controller 130. The registers may be, for example, general-purpose registers of a microcontroller associated with the power analyzer 152. The power analyzer 152 may further be configured to implement power measurement logic, which may be used to check the power usage of the data storage device and/or components thereof against a reference power value (e.g., 6 V). The analysis of the power consumption of the data storage device 120 may involve updating the registers of the power analyzer 152 with values representative of, for example, overall power of the device, noise level, and/or other power, voltage, and/or current levels associated with the device. In certain embodiments, the power analyzer 152 is configured to track voltage spikes experienced by the storage device 120 and/or components thereof. The power analyzer 150 may comprise certain control logic, which may be configured to implement the writing of the power values generated by power measurement logic of the power analyzer to the memory (e.g., power registers) of the power analyzer 152.

The power data stored in, and/or maintained by, the power analyzer 152 may be used by the power analyzer 152 and/or controller 130 for implementing power throttling, as described in detail herein. For example, power throttling may involve a designation of a subset of dies or devices of the nonvolatile memory 140 that may be operated, and/or may involve modification and/or management of the issuance of sequential and random read/write commands with respect to the nonvolatile memory.

The volatile memory 174 may comprise a cache memory configured to temporarily store data in the data storage device 120. The data stored in the volatile memory 174 may not be maintained across a power cycle of the data storage device 120 in some embodiments. The volatile memory 174 may be associated with read/write speeds that are higher than those of the nonvolatile memory 140, such that the volatile memory 174 may be used to temporarily store data that is to be written to the nonvolatile memory 140 and/or data that is read from the nonvolatile memory 140, thereby acting as a buffer for the nonvolatile storage 140. In some embodiments, the volatile memory 174 comprises DRAM. The controller 130 may be configured to store one or more system data structures (e.g., tables, lists, linked list, raise, etc.) in the volatile memory 174 four data management purposes.

The backup power 172 may comprise power storage device(s) that may be relied upon at least in part in the event of a power loss, such that the power may be used to write critical data and/or implement other functions of the data storage device 120. In certain embodiments, the backup power 172 may comprise one or more hold-up capacitors, which may be used to maintain adequate voltage level at the output of the power regulator 152 and to supply certain load(s) of the data storage device 120 when the regulated voltage drops, such as at the half-cycle of an AC power supply voltage. That is, the hold-up capacitor(s) 172 may promote smooth operation of the power supply provided by the power rails 154. The hold-up capacitor(s) may be charged from the output of the regulator 154.

Sensor 176 may comprise any type of sensor that may be utilized or relied upon for power throttling and/or other management operations of the data storage device 120. For example, in certain embodiments, the sensor 176 comprises one or more temperature sensors, which may provide temperature information associated with the data storage device 120 and/or one or more components thereof. Temperature sensor information may be used for temperature management in order to maintain the data storage device 120 and/or one or more components thereof in an operational temperature range, wherein the data storage device 120 may not support read and/or write operations outside of such temperature range. Temperature information may be used to determine when a fan or other cooling component or circuitry is to be activated and/or deactivated, and/or what level of operation such components should be operated at. The sensor 176 may comprise any type or quantity of sensors, such as temperature sensors (e.g., thermistors or the like).

The communication interface 160 between the power analyzer 152 and the controller 130 may be used to communicate power data between the power analyzer 152 and the controller 130. In certain embodiments, the interface may be operated in accordance with a serial protocol such as Inter-Integrated Circuit (I2C), Serial Peripheral Interface (SPI), Universal Asynchronous Receiver/Transmitter (UART), or the like. For example, the interface 160 may be implemented using an interface controller of the controller 130 configured to implement a master-slave, packetswitched serial interface, such as I2C, which may generally be suitable for coupling lower-speed peripheral circuits, such as the power analyzer 152, to processors and/or microcontrollers, such as that of the controller 130, over relatively short-distance. Alternatively, the controller 130 may utilize interface 160 as a UART interface, which provides an asynchronous serial communication interface providing configurable data format and/or transmission speed. Alternatively, the interface 160 may be utilized as a SPI interface, which provides an asynchronous serial communication interface suitable for short-distance communication using single-master communication. The interface 160 may comprise one or more clock and/or data lines.

The power analyzer 152 may be used to store configuration parameters for configuring/initializing the interface 160 and/or power analyzer 152 by the controller 130. The interface 160 may provide a bidirectional interface over which the controller, as a master, communicates with the power analyzer 152, in a master-slave relationship. In certain embodiments, power analyzer 152 may not transmit data to the controller unless it has been addressed by the controller 130. The power analyzer 152 may have a specific device address, and may require configuration upon startup to set the behavior of the device. To such end, the controller 130 may access the internal registers of the power analyzer 152, which may have unique register addresses. The controller 130 may send and/or receive data to or from the power analyzer 152 by reading or writing to or from the registers of the power analyzer 152. The registers may be locations in the power analyzer's memory containing information, whether it be configuration information, or power-related values or information, which may be requested by the controller 130. The controller 130 may write information to the registers of the power analyzer 152 in order to instruct the power analyzer 152 to perform a task, such as provide power-related data or the like.

The power analyzer 152 may be configured to track the amount of power dissipated over the various components of the data storage device individually and/or collectively, wherein such information may be used in connection with power throttling and/or management systems, devices, or mechanisms according to the present disclosure. In some implementations, the data storage device 120 may be able to implement power throttling and/or management using the power analyzer 152 without the need for external measuring instrumentation, as described above. Furthermore, the data storage device 120 may be able to implement power throttling at runtime, rather than being reliant upon pre-calculated power measurements taken from external measuring instrumentation, which may improve the performance of the system 100 and/or the data storage device 120.

Internal Power Analyzer

Figure 2:
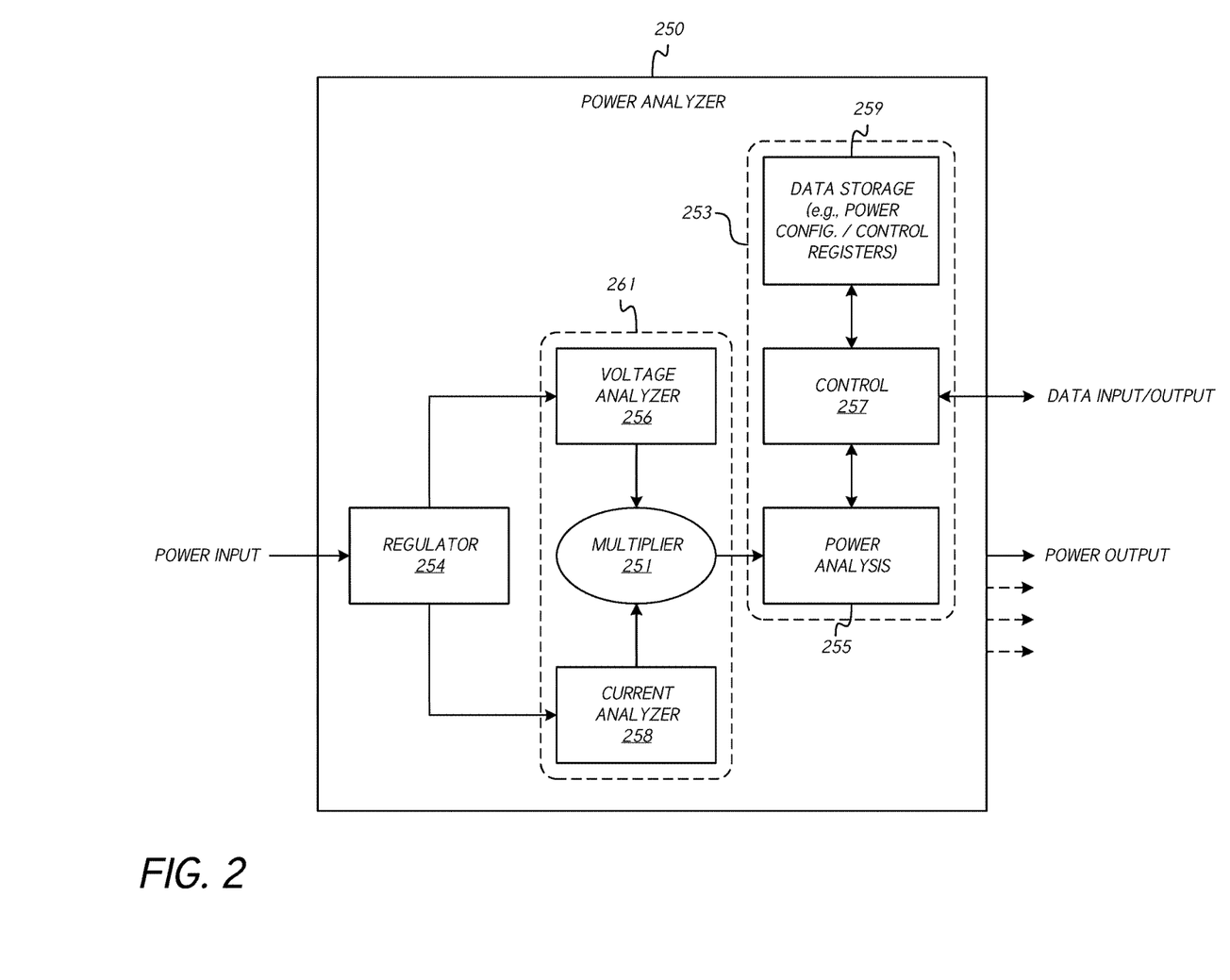
FIG. 2 is a block diagram of a power analyzer in accordance with one or more embodiments of the present disclosure.

FIG. 2 is a block diagram of a power analyzer 250 in accordance with embodiments of the present disclosure. The illustrated components of the power analyzer 250, or a subset thereof, may be embodied in a microchip or other device of a data storage device. The power analyzer 250 may represent an embodiment of the power analyzer 150 shown in FIG. 1 and described in detail above. In certain embodiments, the power analyzer 250 receives power input from, for example, a host system (not shown) coupled to a data storage device/drive associated with the power analyzer 250. For example, the power analyzer 250 may be an internal component of the data storage device/drive.

The power analyzer 250 may comprise a regulator module or circuitry 254. In certain embodiments, the regulator 254 is a DC linear voltage regulator configured to automatically maintain a substantially constant voltage level, and provide one or more fixed voltage rails as power output for powering components/devices electrically coupled to the power analyzer 250. In certain embodiments, the resistance of the regulator 254 may vary in accordance with the load thereof, resulting in a substantially constant output voltage. In some embodiments, the regulator 254 comprises a switching regulator configured to switch on and off one or more active devices in order to maintain an average value output. The regulator 254 may be configured to distribute the power input to a plurality of separate fixed DC voltage rails (shown as power output lines). The regulator 254 may be positioned in parallel with the load rails as a shunt regulator, or may be positioned between the power input and the load rails as a series regulator. In certain embodiments, the regulator 254 is a low dropout regulator (LDO) configured to regulate voltage output at levels that are relatively close to the input power level. Regulator 254 may be configured to distribute the input power to a plurality of peripheral devices or components of the data storage device of which the power analyzer 250 is component, such as to one or more of a backup power device, volatile storage module, temperature sensor, nonvolatile memory controller, nonvolatile memory module, and/or other modules or components.

The power analyzer 250 is configured to analyze the voltage and/or current of the power input signal, which may provide power information representative of the data storage device with which the power analyzer 250 is associated. The power analyzer 250 comprises power measurement circuitry 261, which may include one or more of a voltage analyzer 256, a current analyzer 258, and/or power calculating feature or component, which may comprise a multiplier 251 or other circuitry or module. The power measurement circuitry 261 may provide a means to measure the power level and/or other power-related parameter(s) of the power input. The voltage analyzer 256 is configured to measure the voltage received at the power input, wherein the voltage measured by the voltage analyzer 256 may be received from the regulator 254, as shown. The voltage analyzer 256 may be implemented as a microcontroller, or through one or more different control units. The voltage analyzer 256 may be implemented as software and/or hardware. In some embodiments, the voltage analyzer is implemented using a hardware unit comprising a multimeter, which may comprise an electronic measuring instrument configured to implement one or more measurement functions. For example, the multimeter may be configured to measure voltage, current, and/or resistance. The voltage analyzer 256 may be configured to measure DC voltage and provide an output indicative thereof to a multiplier module/logic 251.

The power analyzer 250 further comprises a current analyzer 258 configured to measure the current received from the regulator 254. The current analyzer/sensor 258 may generate a sensed current value or signal that is proportional to the electrical current of the power supply provided at the power input(s) of the power analyzer 250. The sensed current may be represented as an analog signal. In certain embodiments, a current-to-voltage converter (e.g., transimpedance amplifier) may be used to convert the sensed current to a voltage value. In certain embodiments, the current analyzer 250 comprises an ammeter for measuring the current of the input signal. The current analyzer 258 may be configured to provide an output signal to the multiplier module/logic 251.

The multiplier module/logic 251 may be implemented through hardware and/or software, and may be configured to multiply voltage measurement input from the voltage analyzer 256 with current measurement input from the current analyzer 258 in order to generate an output representative of power according to the relationship: power (P)=voltage (V)×current (C).

The power analyzer 250 may further comprise power data control circuitry, which may include one or more of a power analysis module 255 (may also be referred to as a "power measurement module" in certain contexts), a control module 257, and power configuration and/or control registers 259. In some contexts, "power data control circuitry" or "control circuitry" may refer to either or both of the power analysis module 255 and the control module 257. In certain embodiments, the power analysis module 255 and the control module 257 may be a single module. One or more of the functional units 255, 257, 259 may be embodied in a microcontroller 253, hardware state machine, or other circuitry or device(s). For example, the microcontroller 253 may comprise a single chip including a microprocessor core, register memory, one or more input output (I/O) boards, analog-to-digital converters (ADCs) and/or other functional sub-system(s). The power configuration and/or control registers 259 may provide a relatively fast way to collect and/or store data. For example, the registers 259 may be used to store data for manipulation within the microcontroller 253.

The power analysis module/logic 255 may be configured to receive input from the multiplier module 251, and to utilize control logic 257 to update digital values representative of power measurements within the power analyzer 250 in the power control registers 259. In certain embodiments, the power analysis module 255 is configured to evaluate the power determined based on the outputs from the voltage analyzer 256 and the current analyzer 258 with respect to a reference value. For example, the determined power may be evaluated vis-à-vis one or more operational limits of the data storage device associated with the power analyzer 250. The power analysis module 255 may further keep track of noise level and/or other parameters or characteristics of the input power, which may be used to validate the actual value of power received by the power analysis module 255. The power analysis module 255 may further check for variations in power supply in order to promote storing of correct data to the power registers.

The control logic module 257 may be configured to write the power values received from the power analysis module 255 to the power registers 259. The control module 257 may further be used to communicate with the controller of the data storage device over the data input/output interface coupling the power analyzer 250 with the controller of the data storage device. In certain embodiments, the control module 257 may assist in communicating with the controller of the data storage device using a serial communication protocol, such as I2C, SPI, UART, or the like, in order to configure the power analyzer 250 and/or interface between the power analyzer 250 and the controller of the data storage device. The control module 257 may further be configured to facilitate the reading and writing of the power configuration and/or control registers 259 by the controller of the data storage device associated with the power analyzer 250.

The power configuration and/or control registers 259 may comprise data storage (i.e., memory) that may be utilized to store values representative of, for example, power measurements generated by the power analyzer 250. For example, current, voltage, and/or power values may be saved in the registers 259. The registers 259 may store the power values in addition to configuration parameters used to configure the power analyzer 250 using the control module 257. The controller of the data storage device associated with power analyzer 250 may be able to read the power registers and/or obtain the current power values of the data storage device, as determined by the power analyzer 250, using the control module 257 and the registers 259.

Power Management Processes

Figure 3:
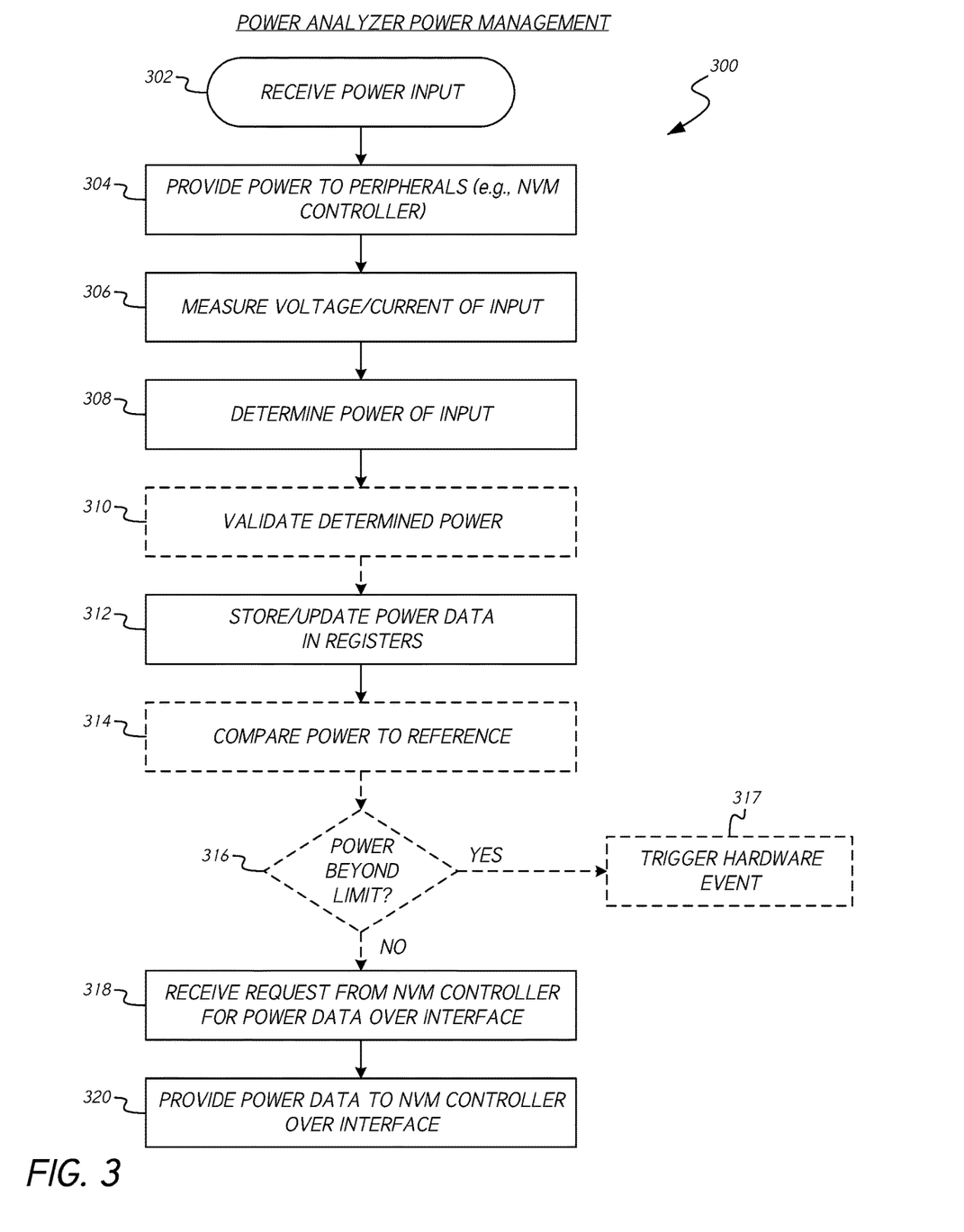
FIG. 3 illustrates a process for managing power in a data storage device according to one or more embodiments.

FIG. 3 illustrates a process 300 for managing power in a data storage device according to one or more embodiments. The process 300 may be considered a power-analyzer-side power management process with respect to a data storage system including a data storage device comprising an internal power analyzer, as described herein. The process 300 may be performed to in order to implement power throttling at runtime of a data storage device. Although the flow diagram of FIG. 3 illustrates process steps in a particular order, it should be understood that the steps of the process 300 may be executed or performed in any suitable or desirable order, and need not be performed according to the illustrated order. Furthermore, while certain process steps are illustrated, it should be understood that the process 300 may involve additional steps not illustrated in the diagram of FIG. 3, and/or may omit certain of the illustrated steps, while still falling within the scope of the present disclosure. Some or all of the steps of the process 300 may be performed at least in part by an internal power analyzer module or circuitry of a data storage device or other computing device or system.

The process 300 may be performed in connection with a data storage device configured to be powered-on using a host supply voltage, or other power source. Such power may be provided as an input to a power analyzer module or component of the data storage device. At block 302, the process 300 involves receiving a power input. For example, the power input may be received by a power analyzer module, and may be received from a power source. For example, the power source may be provided by a host device or system electrically coupled to the power analyzer and/or data storage device associated therewith. The power received a block 302 may be any suitable power level or type of power source such as AC power or DC power. On power-up, the power analyzer may function as a voltage regulator (e.g., low-dropout regulator), thereby supplying different voltages to different modules, such as double data rate (DDR) NAND flash memory, and/or other module(s). The power analyzer may further calculate power values and store the same in data storage register(s).

At block 304, the process 300 involves providing power to one or more peripheral components of the data storage device, such as to a nonvolatile memory controller and/or other components of the data storage device. For example, the power may be provided in a distributed manner on separate power rails, as described herein, and may be derived from the power received block 302. In certain embodiments, the block 304 involves regulating the received power source to provide fixed DC voltage levels on each of a plurality of voltage/power rails, each designed to provide distributed voltage/power to one or more components of the data storage device. The provision and/or regulation/distribution of power according to block 304 may be performed at least in part by the power analyzer circuitry internal to the data storage device.

At block 306, the process involves measuring voltage and/or current levels associated with the received power input to the data storage device. For example, one or more of a voltage analyzer and the current analyzer may be implemented to generate or derive voltage and/or current level values. Such values may be generated and/or provided in a digital or analog format.

At block 308, the process 300 involves determining power associated with the data storage device and/or power analyzer based at least in part on the measured voltage and/or current, as provided in accordance with block 306. For example, power values may be calculated or determined based on the product of derived voltage and current values. At block 310, the process 300 may involve validating the determined power.

At block 312, the process 300 involves storing and/or updating power data in data storage of the power analyzer module or circuitry. For example, the data storage of the power analyzer module or circuitry may be embodied and one or more data storage registers, which may be internal registers of a microcontroller, for example. After configuration, the power registers of the power analyzer may be read by a controller of the associated data storage device in order to determine the power of the data storage device at runtime.

At block 314, the process 300 may involve comparing the determined power level/value(s) to one or more reference values. Such comparison may be performed in order to determine whether the determined power falls within an acceptable or desirable range, or within a predetermined power limit. At decision block 316, the process 300 involves determining whether the power level is above or below one or more power limits. If the power level is beyond a predetermined limit (e.g., above or below limit level), the process 300 may proceed to block 317, where a hardware event may be triggered. For example, at block 317, the power analyzer may generate and/or provide an interrupt signal to a controller of the data storage device. Such interrupt or signal may indicate that the power level is outside of a desirable range. Certain power throttling and/or power optimization mechanisms and/or steps may be implemented in response to the hardware event trigger.

If the power level is not beyond predetermined power limit, the process 300 may proceed to block 318, where a request may be received from a nonvolatile memory controller of the data storage device for power data stored in the power analyzer module or circuitry. For example, the power analyzer may receive the request over a communication interface between the power analyzer and the controller. Such interface may comprise, for example, a simple serial interface, as described above. The request received a block 318 may be for the power data stored by the power analyzer in the registers in connection with block 312, as described above. For example, as described above, the power analyzer may calculate the power of the data storage device and store data indicative thereof in its internal registers. The process 300 may involve, by the power analyzer, keeping track of the maximum and minimum power supported by the data storage device, and triggering a hardware event or interrupt through one or more interface pins in the case that the power exceeds the minimum or maximum limit. The triggering of the hardware event at block 317 may serve to protect the data storage device from damage in some implementations.

In response to receiving the request for power data at block 318, the process may involve reading the power data from the registers and responding to the device controller therewith. At block 320, the process 300 involve providing the requested power data to the nonvolatile memory controller over the communication interface. Provision of the power data may enable the controller to implement certain power throttling and/or power optimization or management mechanisms and/or processes, in accordance with the present disclosure. The power data provided at block 320 may assist in optimizing the power inside the data storage device. Furthermore, throttling power in the data storage device based on the power values obtained at runtime may assist in increasing the overall performance of the system.

Figure 4:
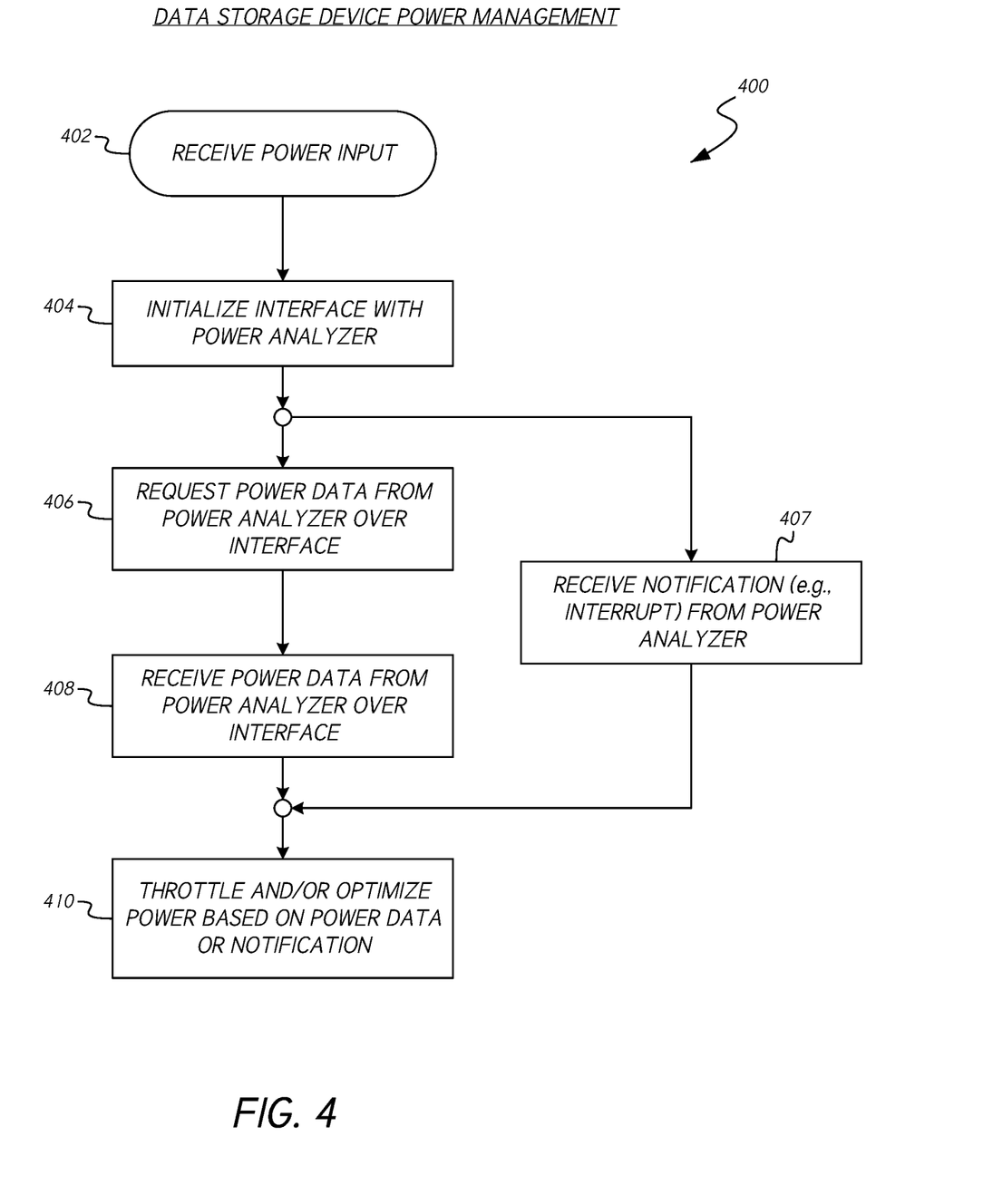
FIG. 4 illustrates a process for managing power in a data storage device according to one or more embodiments.

FIG. 4 illustrates a process 400 for managing power in a data storage device according to one or more embodiments. Whereas some power management processes rely on power logs used after the data storage device had run, and relied on separate monitoring outside of the data storage device/drive, the process 400 may allow for on-the-fly adjustment as the data storage device operates using internal power analyzer component(s). Although the flow diagram of FIG. 4 illustrates process steps in a particular order, it should be understood that the steps of the process 400 may be executed or performed in any suitable or desirable order, and need not be performed according to the illustrated order. Furthermore, while certain process steps are illustrated, it should be understood that the process 400 may involve additional steps not illustrated in the diagram FIG. 4, and/or may omit certain of the illustrated steps while still falling within the scope of the present disclosure. Some or all of the steps of the process 400 may be performed at least in part by a controller or control circuitry of a data storage device or other computing device or system.

At block 402, the process 400 involves receiving power input. For example, the power input may be received from a host device or system electrically coupled to the data storage device. The data storage device may include an internal power analyzer that supports the capabilities of a linear voltage regulator configured to distribute the voltages for different peripherals of the data storage device. That is, the power analyzer may act as a power rail(s) for the data storage device.

At block 404, the process 400 involves initializing the communication interface between the controller and the power analyzer module or circuitry. When the firmware of the data storage device boots-up, step 404 of the process may be performed in order to configure the power analyzer from the drive controller to get data from power analyzer. For example, the controller of the data storage device may be configured to control the power analyzer by configuring its configuration registers through any suitable or desirable communication protocol, such as I2C, SPI or UART. For example, a communication interface between the controller and the power analyzer may need to be configured using the firmware of the data storage device (e.g., SSD) controller, which can assist in accessing the power analyzer registers, as described above. That is, configuration may be necessary or helpful in fetching power values read from the register(s) of the power analyzer. Once the power values are stored in the analyzer and the data storage device is operational, the firmware of the controller may implement one or more steps of the process 400, such as initializing/configuring the interface.

At block 406, the process 400 involves requesting power data from the power analyzer over the initialized interface. For example, after initialization, the data storage device controller may send a read command to the power analyzer through I2c protocol, or other relevant protocol. A read command may be sent to read the power register value(s) from power analyzer. After reading the power register value(s), the power analyzer may respond to the controller read command with power values from its internal register(s).

At block 408, the process 400 involves receiving power data from the power analyzer over the interface in response to the request provided at block 406. Alternatively, or in addition, to the process steps 406 and 408, the process 400 may involve receiving a notification, such as an interrupt or the like, from the power analyzer. For example, such notification may be indicative a power analysis performed by the power analyzer.

At block 410, the process 400 involves throttling and/or optimizing power in the data storage device based at least in part on the power data received from the power analyzer and/or the notification received at block 407. Power throttling according to the process 400 may involve modifying a number of dies of the data storage device that are operational, and/or may involve modifying the issuance of sequential/random read and/or write commands. According to the process 400, power throttling may be performed at run time, rather than using pre-calculated values taken from measurements from, for example, an external oscilloscope or the like.

Additional Embodiments

Those skilled in the art will appreciate that in some embodiments, other types of data storage systems and/or signal transmission schemes can be implemented. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Methods and processes described herein may be embodied in, and partially or fully automated via, software code modules executed by one or more general and/or special purpose computers. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A data storage device comprising:
a power input port;
a nonvolatile memory module;
a controller for the nonvolatile memory module; and
a power analyzer electrically coupled to the power input port and configured to:
receive input power from the power input port;
generate a power measurement signal indicating a power level of the input power;
determine whether a power level of the input power is beyond a predetermined limit based on the power measurement signal to facilitate power throttling in the data storage device;
determine power data associated with the data storage device based on the power measurement signal; and
store the power data in a memory of the power analyzer.

2. The data storage device of claim 1, wherein the power analyzer comprises:
power measurement circuitry;
power data control circuitry; and
one or more memory registers;
wherein the power analyzer is further configured to:
determine the power data using the power measurement circuitry; and
store the power data in the one or more memory registers using the power data control circuitry.

3. The data storage device of claim 1, wherein the controller is communicatively coupled to the power analyzer over a communication interface.

4. The data storage device of claim 3, wherein the communication interface is a serial interface.

5. The data storage device of claim 4, wherein the communication interface conforms to a protocol selected from the group of protocols consisting of Inter-Integrated Circuit (I2C), Serial Peripheral Interface (SPI), and Universal Asynchronous Receiver/Transmitter (UART).

6. The data storage device of claim 3, wherein the controller is configured to:
request the power data from the power analyzer;
receive the power data from the power analyzer over the communication interface; and
implement the power throttling in the data storage device based on the power data.

7. The data storage device of claim 6, wherein the controller is further configured to implement the power throttling in the data storage device at least in part by reducing a number of memory units of the nonvolatile memory module that are enabled.

8. The data storage device of claim 3, wherein the controller is further configured to:
access configuration parameters stored in the memory of the power analyzer; and
configure the communication interface using the configuration parameters.

9. The data storage device of claim 1, wherein the power analyzer comprises power distribution circuitry including a plurality of power rails.

10. A power analyzer comprising:
a power input configured to receive a power signal;
a voltage regulator coupled to the power input;
power measurement circuitry configured to generate a power measurement signal indicating a power level of the power signal;
one or more memory registers; and
control circuitry configured to:
receive the power measurement signal;
determine power data based on the power measurement signal;
determine whether the power level of the power signal is beyond a predetermined limit based on the power measurement signal; and
store the power data in the one or more memory registers.

11. The power analyzer of claim 10, wherein the power measurement circuitry comprises a voltage analyzer configured to generate a voltage measurement signal indicating a voltage level of the power signal.

12. The power analyzer of claim 11, wherein the power measurement circuitry further comprises:
a current analyzer configured to generate a current measurement signal indicating a current level of the power signal; and
a multiplier configured to generate the power measurement signal using the voltage measurement signal and the current measurement signal.

13. The power analyzer of claim 10, wherein the voltage regulator is configured to distribute the power signal to a plurality of fixed-voltage rails.

14. The power analyzer of claim 10, further comprising a communication interface, wherein:
the communication interface is a serial interface communicatively coupled to a controller of a data storage device; and
the power analyzer is an internal component of the data storage device.

15. The power analyzer of claim 14, wherein the control circuitry is further configured to provide the power data from the one or more memory registers to the controller of the data storage device using the communication interface.

16. The power analyzer of claim 15, wherein:
the one or more memory registers store configuration parameters for configuring the interface; and
the control circuitry is further configured to provide the configuration parameters from the one or more memory registers to the controller of the data storage device.

17. The power analyzer of claim 10, wherein the control circuitry comprises a microcontroller.

18. The power analyzer of claim 17, wherein the one or more memory registers comprise internal general-purpose registers of the microcontroller.

19. The power analyzer of claim 10, wherein the power data comprises one or more of voltage measurement values, current measurement values, and power measurement values.

20. The power analyzer of claim 10, wherein the control circuitry is further configured to track one or more of power noise level and voltage spikes associated with the power signal.

21. A method of managing power in a data storage device, the method comprising:
by an internal power analyzer of the data storage device:
receiving an input power signal;
generating a power measurement signal of the input power signal;
measuring a power level of the input power signal based on the power measurement signal;
determining whether the power level of the input power is beyond a predetermined limit to facilitate power throttling in the data storage device;
generating power data associated with the data storage device based on the power level; and
storing the power data in memory of the power analyzer.

22. The method of claim 21, further comprising validating the power level.

23. The method of claim 21, further comprising:
determining that the power level is beyond the predetermined limit; and
triggering a hardware event in response to said determination.

24. The method of claim 23, wherein said triggering the hardware event comprises providing an interrupt to a controller of the data storage device.

25. The method of claim 21, further comprising initiating the power throttling in the data storage device based on the power level.

26. The method of claim 21, further comprising:
receiving a command from a controller of the data storage device coupled to the power analyzer over a communication interface; and
providing the power data to the controller over the communication interface in response to the command.

27. The method of claim 21, the method further comprising:
by a controller of the data storage device:
initializing a communication interface between the controller and the internal power analyzer of the data storage device;
sending a request for the power data to the internal power analyzer over the communication interface;
receiving the power data from the internal power analyzer over the interface; and
throttling power in the data storage device based on the power data.

28. The method of claim 27, wherein said throttling power comprises reducing a number of nonvolatile data storage modules of the data storage device that are operated.

29. The method of claim 27, wherein said throttling power comprises modifying a workload of the data storage device.

30. The method of claim 27, further comprising receiving a notification from the internal power analyzer over the communication interface, the notification indicating that a power level of the data storage device exceeds a limit.

31. A data storage device comprising:
a power input port configured to receive input power;
a nonvolatile memory module;
a controller for the nonvolatile memory module;
means for measuring a power level of the input power, configured to:
generate a voltage measurement signal indicating a voltage level of the input power;
generate a current measurement signal indicating a current level of the input power; and
generate the power level using the voltage measurement signal and the current measurement signal;

means for storing power data indicating the power level; and means for providing the power data to the controller.

32. The data storage device of claim 31, wherein the means for storing power data indicating the power level comprises:

memory registers; and power data control circuitry.

33. The data storage device of claim 31, wherein the means for providing the power data to the controller comprises a serial communication interface and control circuitry.

34. A power analyzer comprising:

a power input configured to receive a power signal;

a voltage regulator coupled to the power input, wherein the voltage regulator is configured to distribute the power signal to a plurality of fixed-voltage rails;

power measurement circuitry configured to generate a power measurement signal indicating a power level of the power signal;

one or more memory registers; and control circuitry configured to:
  receive the power measurement signal;
  determine power data based on the power measurement signal; and
  store the power data in the one or more memory registers.

35. The power analyzer of claim 34, wherein the power measurement circuitry further comprises:

a voltage analyzer configured to generate a voltage measurement signal indicating a voltage level of the power signal;

a current analyzer configured to generate a current measurement signal indicating a current level of the power signal; and a multiplier configured to generate the power measurement signal using the voltage measurement signal and the current measurement signal.

36. The power analyzer of claim 34, wherein the control circuitry is further configured to track one or more of power noise level and voltage spikes associated with the power signal.

* * * * *